(12) United States Patent
Jang et al.

(10) Patent No.: US 9,052,436 B2
(45) Date of Patent: Jun. 9, 2015

(54) METHOD FOR MANUFACTURING RESIN FOR URETHANE-BASED OPTICAL MATERIAL, RESIN COMPOSITION FOR SAME, AND OPTICAL MATERIAL MANUFACTURED THEREBY

(75) Inventors: Dong Gyu Jang, Daejeon (KR); Soo Gyun Roh, Daejeon (KR); Jong Hyo Kim, Daejeon (KR)

(73) Assignee: KOC SOLUTION CO., LTD., Daejeon (KR)

( * ) Notice: Subject to any disclaimer, the term of this patent is extended or adjusted under 35 U.S.C. 154(b) by 0 days.

(21) Appl. No.: 13/977,485

(22) PCT Filed: Dec. 29, 2011

(86) PCT No.: PCT/KR2011/010315
§ 371 (c)(1),
(2), (4) Date: Jun. 28, 2013

(87) PCT Pub. No.: WO2012/091493
PCT Pub. Date: Jul. 5, 2012

(65) Prior Publication Data
US 2013/0303721 A1    Nov. 14, 2013

(30) Foreign Application Priority Data

Dec. 29, 2010  (KR) .................. 10-2010-0137426
Dec. 29, 2011  (KR) .................. 10-2011-0145957

(51) Int. Cl.
| | | |
|---|---|---|
| C08G 18/00 | (2006.01) | |
| G02B 1/04 | (2006.01) | |
| C08G 18/52 | (2006.01) | |
| C08G 18/83 | (2006.01) | |
| C08G 18/38 | (2006.01) | |
| C08G 18/72 | (2006.01) | |
| C08G 18/73 | (2006.01) | |
| C08G 18/75 | (2006.01) | |
| G02B 3/00 | (2006.01) | |

(52) U.S. Cl.
CPC .............. *G02B 1/041* (2013.01); *C08G 18/52* (2013.01); *C08G 18/834* (2013.01); *C08G 18/3855* (2013.01); *C08G 18/3897* (2013.01); *G02B 3/00* (2013.01); *C08G 18/3876* (2013.01); *G02B 1/04* (2013.01); *C08G 18/722* (2013.01); *C08G 18/73* (2013.01); *C08G 18/755* (2013.01); *C08G 18/758* (2013.01)

(58) Field of Classification Search
CPC .. C08G 18/52; C08G 18/834; C08G 18/3855; C08G 18/3897
USPC .............................................. 528/77, 85, 374
See application file for complete search history.

(56) References Cited

U.S. PATENT DOCUMENTS

2010/0010192 A1†  1/2010  Kawaguchi

FOREIGN PATENT DOCUMENTS

| JP | 05-117355 A | 5/1993 |
|---|---|---|
| JP | 11-320580 A | 11/1999 |
| JP | 2000-108219 A | 4/2000 |
| JP | 2006-162926 A | 6/2006 |
| KR | 10-2009-0051090 A | 5/2009 |

† cited by third party

*Primary Examiner* — Michael L Leonard
(74) *Attorney, Agent, or Firm* — Susan Paik

(57) ABSTRACT

A method of preparing an optical material by polymerizing a resin composition including a thiol group-containing compound and an isocyanate group-containing compound, particularly, a method of preparing a high-quality urethane-based optical material using a universal polyisocyanate compound. According to one aspect, a resin composition including a polythiol compound and a widely available polyisocyanate compound, as main components, and having a moisture content of 300 to 3,000 ppm is template-polymerized to prepare the optical material. A colorless, transparent, and high-quality urethane-based optical material may be efficiently prepared in high yield using a low-cost and widely available isocyanate compound through template-polymerization using a tape while minimizing generation of white tape residues and foaming.

8 Claims, No Drawings

METHOD FOR MANUFACTURING RESIN FOR URETHANE-BASED OPTICAL MATERIAL, RESIN COMPOSITION FOR SAME, AND OPTICAL MATERIAL MANUFACTURED THEREBY

BACKGROUND OF THE INVENTION

1. Technical Field

The present invention relates to a method of preparing an optical material by polymerizing a resin composition including a thiol group-containing compound and an isocyanate group-containing compound, and more particularly, to a method of preparing a high-quality urethane-based optical material using a widely available polyisocyanate compound, a resin composition for the same, and an optical material prepared using the resin composition.

2. Description of Related Art

Plastic optical materials are lightweight and possess superior impact resistance and are easily dyed, as compared to optical materials formed of inorganic materials. In recent years, a variety of resins and plastic materials have been used in optical materials, and property expectations therefor have also been raised.

A polythiourethane optical resin prepared using a polythiol compound and an isocyanate compound has been widely available for optical lenses due to excellent optical properties such as transparency, Abbe number, transmittance, and tensile strength. However, polymerization imbalance and white tape residue generation, which generally occur during preparation of an optical material by curing a resin composition including a polythiol compound and a widely available isocyanate compound, are responsible for deterioration of optical properties of the optical resin. Particularly, white tape residues and foams adversely affect performance of the optical material, bringing about defects and deterioration of lenses.

SUMMARY OF THE INVENTION

An isocyanate compound having high miscibility with a polythiol compound, such as 3,8-bis(isocyanatomethyl)tricyclo[5,2,1,02,6]decane, 3,9-bis(isocyanatomethyl)tricyclo[5,2,1,02,6]decane, 4,8-bis(isocyanatomethyl)tricyclo[5,2,1,02,6]decane, 4,9-bis(isocyanatomethyl)tricyclo[5,2,1,02,6]decane, 2,5-bis(isocyanatomethyl)bicyclo[2,2,1]heptane, and 2,6-bis(isocyanatomethyl)bicyclo[2,2,1]heptanes may be mixed with the polythiol compound and thermally cured without causing polymerization imbalance and white tape residues. However, such isocyanate compounds are expensive due to complex manufacturing process and high manufacturing costs thereof. On the other hand, in an optical resin prepared by curing a mixture of a low-cost and widely available isocyanate compound, such as isophorone diisocyanate, dicyclohexylmethane-4,4-diisocyanate ($H_{12}MDI$), hexamethylene diisocyanate, methylcyclohexane diisocyanate, tolylene diisocyanate, phenylene diisocyanate, 1,3,5-tris(6-isocyanatohexyl)-[1,3,5]-triazine-2,4,6-(1H,3H,5H)-trione (HDI trimer), o,m,p-xylylene diisocyanate, and tetramethylxylylene diisocyanate (TMXDI), and a polythiol compound, polymerization imbalance and white tape residues, particularly, white tape residues and foams are often generated.

Therefore, the present invention has been made in view of the above problems, and it is an object of the present invention to provide a method of preparing a urethane-based optical material using a widely available isocyanate compound while preventing generation of white tape residues and foams.

The present inventors have found that a polymerization rate of a composition considerably affects generation of white tape residues and foams. When the composition has an appropriate polymerization rate, white tape residues may be inhibited and foaming may be minimized. In addition, a moisture content of the composition plays an important role in the polymerization rate. According to the present invention, it is confirmed that, when the moisture content of the composition is within a predetermined range, the polymerization rate is suitable for preventing white tape residues and minimizing foaming. Based thereon, according to the present invention, a colorless and transparent polyurethane-based optical material may be efficiently prepared in high yield using a low-cost and widely available isocyanate while minimizing generation of white tape residues and foams by adjusting the polymerization rate by controlling the moisture content.

When the reaction rate of the isocyanate compounds is low, moisture may accelerate the reaction rate. This is because an amine compound generated via reaction between moisture and isocyanate slightly accelerates the reaction rate.

In addition, a high moisture content may deteriorate lens transparency. Excessive moisture may generate a large amount of carbon dioxide, thereby generating foams during preparation of the optical lens. Accordingly, a defect rate increases.

Korean Patent Application Publication No. 10-2009-0051090 discloses a method of minimizing striae and white tape residues by adjusting a moisture content of a composition to 300 ppm or less by reducing a moisture content of a thiol compound to 600 ppm or less. However, it is difficult to reduce a moisture content of the thiol compound to a low level during the preparation thereof. Even though it is possible to remove moisture from the thiol compound, the thiol compound may continuously absorb moisture during storage. Thus, it is difficult to maintain the moisture content to a lower level. According to the present invention, it was found that an appropriate moisture content may prevent generation of white tape residues and foams without changing optical properties such as striae, thermal resistance, and thermal stability. In addition, as a result of careful observation of transmittance and transparency on the assumption that moisture may adversely affect the optical material requiring transparency, it was proved that a suitable moisture content does not adversely affect the optical material.

In accordance with the present invention, the above and other objects can be accomplished by the provision of a method of preparing a resin for a urethane-based optical material by template-polymerizing a resin composition including a polythiol compound and a polyisocyanate compound. The resin composition has a moisture content of 300 to 3,000 ppm, and the polyisocyanate compound includes at least one compound selected from the group consisting of isophorone diisocyanate, dicyclohexylmethane-4,4-diisocyanate ($H_{12}MDI$), hexamethylene diisocyanate, methylcyclohexane diisocyanate, tolylene diisocyanate, phenylene diisocyanate, 1,3,5-tris(6-isocyanatohexyl)-[1,3,5]-triazine-2,4,6-(1H,3H,5H)-trione (HDI trimer), o,m,p-xylylene diisocyanate, and tetramethylxylylene diisocyanate (TMXDI).

The resin composition may further include at least one iso(thio)cyanate compound in addition to the polyisocyanate compound.

In accordance with another aspect of the present invention, there is provided a resin composition for a urethane-based optical material including a polythiol compound and a polyisocyanate compound including at least one compound selected from the group consisting of isophorone diisocyanate, dicyclohexylmethane-4,4-diisocyanate ($H_{12}MDI$), hexamethylene diisocyanate, methylcyclohexane diisocyanate, tolylene diisocyanate, phenylene diisocyanate, 1,3,5-tris(6-isocyanatohexyl)-[1,3,5]-triazine-2,4,6-(1H,3H,5H)-trione (HDI trimer), o,m,p-xylylene diisocyanate, and tetramethylxylylene diisocyanate (TMXDI). The resin composition has a moisture content of 300 to 3,000 ppm.

In accordance with a further aspect of the present invention, there is provided a resin for a urethane-based optical material prepared using the method and an optical lens formed of the resin for a urethane-based optical material. The optical lens includes lenses for eyeglasses.

DETAILED DESCRIPTION OF PREFERRED EMBODIMENTS

According to an embodiment of the present invention, a polyurethane-based resin for an optical material is prepared by polymerizing a resin composition including a polythiol compound and a polyisocyanate compound. The resin composition may have a moisture content of 300 to 3,000 ppm. It is difficult to remove moisture contained in the polythiol compound as a raw material so as to reduce the moisture content of the composition below 300 ppm. Furthermore, the moisture content of the composition may be in the range of 300 to 3,000 ppm in consideration of a polymerization rate within which generation of white tape residues and foams is inhibited.

The polythiol compound contained in the resin composition may have a moisture content of 600 to 6,000 ppm, preferably, 600 to 3,000 ppm to inhibit generation of white tape residues and foams. In this regard, the moisture content was measured using a moisture analyzer. The polythiol compound may be a compound having at least two thiol groups, without being limited thereto. For example, the polythiol compound may include at least one compound selected from the group consisting of 4-mercaptomethyl-1,8-dimercapto-3,6-dithiaoctane, 2,3-bis(2-mercaptoethylthio)-3-propane-1-thiol, 2,2-bis(mercaptomethyl)-1,3-propanedithiol, bis(2-mercaptoethyl)sulfide, tetrakis(mercaptomethyl)methane, 2-(2-mercaptoethylthio)propane-1,3-dithiol, 2-(2,3-bis(2-mercaptoethylthio)propylthio)ethanethiol, bis(2,3-dimercaptopropanyl)sulfide, bis(2,3-dimercaptopropanyl) disulfide, 1,2-bis(2-mercaptoethylthio)-3-mercaptopropane, 1,2-bis(2-(2-mercaptoethylthio)-3-mercaptopropylthio) ethane, bis(2-(2-mercaptoethylthio)-3-mercaptopropyl)sulfide, 2-(2-mercaptoethylthio)-3-2-mercapto-3-[3-mercapto-2-(2-mercaptoethylthio)-propylthio]propylthio-propane-1-thiol, 2,2-bis-(3-mercapto-propyonyloxymethyl)butyl ester, 2-(2-mercaptoethylthio)-3-(2-(2-[3-mercapto-2-(2-mercaptoethylthio)-propylthio]ethylthio)ethylthio)propane-1-thiol, (4R,11S)-4,11-bis(mercaptomethyl)-3,6,9,12-tetrathiatetradecane-1,14-dithiol, (S)-3-((R-2,3-dimercaptopropyl)thio) propane-1,2-dithiol, (4R,14R)-4,14-bis(mercaptomethyl)-3, 6,9,12,15-pentathiaheptane-1,17-dithiol, 3-((3-mercapto-2-((2-mercaptoethyl)thio)propyl)thio)propyl)thio)-2-((2-mercaptoethyl)thio)propane-1-thiol, 3,3'-dithiobis(propane-1,2-dithiol), (7R,11S)-7,11-bis(mercaptomethyl)-3,6,9,12, 15-pentathiaheptane-1,17-dithiol, (7R,12S)-7,12-bis (mercaptomethyl)-3,6,9,10,13,16-hexathiaoctadecane-1,18-dithiol, 5,7-dimercaptomethyl-1,11-dimercapto-3,6,9-trithiaundecane, 4,7-dimercaptomethyl-1,11-dimercapto-3, 6,9-trithiaundecane, 4,8-dimercaptomethyl-1,11-dimercapto-3,6,9-trithiaundecane, pentaerythritol tetrakis(3-mercaptopropionate), trimethylolpropane tris(3-mercaptopropionate), pentaerythritol tetrakis(2-mercaptoacetate), bispentaerythritol-ether-hexakis(3-mercaptopropionate), 1,1,3,3-tetrakis(mercaptomethylthio) propane, 1,1,2,2-tetrakis(mercaptomethylthio)ethane, 4,6-bis(mercaptomethylthio)-1,3-dithiane, and 2-(2,2-bis (mercaptodimethylthio)ethyl)-1,3-dithiethane. Preferably, the polythiol compound may be 2-(2-mercaptoethylthio)propane-1,3-dithiol, 2,3-bis(2-mercaptoethylthio)propane-1-thiol, 2-(2,3-bis(2-mercaptoethylthio)propylthio) ethanethiol, 1,2-bis(2-mercaptoethylthio)-3-mercaptopropane, 1,2-bis(2-(2-mercaptoethylthio)-3-mercaptopropylthio)-ethane, bis(2-(2-mercaptoethylthio)-3-mercaptopropyl)sulfide, 2-(2-mercaptoethylthio)-3-2-mercapto-3-[3-mercapto-2-(2-mercaptoethylthio)-propylthio]propylthio-propane-1-thiol, 2,2'-thiodiethanethiol, 4,14-bis(mercaptomethyl)-3,6,9,12,15-pentathiaheptadecane-1,17-dithiol, 2-(2-mercaptoethylthio)-3-[4-(1-{4-[3-mercapto-2-(2-mercaptoethylthio)-propoxy]-phenyl}-1-methylethyl)-phenoxy]-propane-1-thiol, pentaerythritol tetrakis(3-mercaptopropionate), pentaerythritol mercaptoacetate, trimethylolpropane tris-mercaptopropionate, glyceroltrimercaptopropionate, or dipentaerythritolhexamercaptopropionate, or any combination of two thereof. In addition, any one of the aforementioned compounds including an unreacted hydroxyl group may also be used.

The polyisocyanate compound used in the resin composition according to the present invention may be a low-cost widely available isocyanate compound. Preferably, the isocyanate compound may include at least one polyisocyanate selected from the group consisting of isophorone diisocyanate, dicyclohexylmethane-4,4-diisocyanate ($H_{12}MDI$), hexamethylene diisocyanate, methylcyclohexane diisocyanate, tolylene diisocyanate, phenylene diisocyanate, 1,3,5-tris(6-isocyanatohexyl)-[1,3,5]-triazine-2,4,6-(1H,3H,5H)-trione (HDI trimer), o,m,p-xylylene diisocyanate, and tetramethylxylylene diisocyanate (TMXDI).

The resin composition according to the present invention may further include an iso(thio)cyanate compound in addition to the at least one isocyanate compound. The iso(thio) cyanate compound may include at least one compound selected from the group consisting of: an aliphatic isocyanate compound including 2,2-dimethylpentane diisocyanate, 2,2, 4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanate-4-isocyanatomethyloctane, bis(isocyanatoethyl)carbonate, and bis(isocyanatoethyl)ether, an alicyclic isocyanate compound including 1,2-bis(isocyanatomethyl)cyclohexane, 1,3-bis (isocyanatomethyl)cyclohexane, 1,4-bis(isocyanatomethyl) cyclohexane, cyclohexane diisocyanate, methylcyclohexane diisocyanate, dicyclohexyldimethylmethane isocyanate, and 2,2-dimethyldicyclohexylmethane isocyanate, an aromatic isocyanate compound including bis(isocyanatobutyl)benzene, bis(isocyanatomethyl)naphthalene, bis(isocyanatomethyl)diphenylether, phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4-diphenylmethane diisocyanate, 3,3-dimethyldiphenylmethane-4,4-diisocyanate, bibenzyl-4,4-diisocyanate, bis(isocyanatophenyl)ethylene, 3,3-dimethoxybiphenyl-4,4-diisocyanate, hexahydrobenzene diisocyanate, and hexahydrodiphenylmethane-4,4-diisocyanate, a sulfur-containing aliphatic isocyanate compound including bis(isocyanatoethyl)sulfide, bis(isocyanatopropyl)

sulfide, bis(isocyanatohexyl)sulfide, bis(isocyanatomethyl)sulfone, bis(isocyanatomethyl)disulfide, bis(isocyanatopropyl)disulfide, bis(isocyanatomethylthio)methane, bis(isocyanatoethylthio)methane, bis(isocyanatoethylthio)ethane, bis(isocyanatomethylthio)ethane, and 1,5-diisocyanato-2-isocyanatomethyl-3-thiapentane, a sulfur-containing aromatic isocyanate compound including diphenylsulfide-2,4-diisocyanate, diphenylsulfide-4,4-diisocyanate, 3,3-dimethoxy-4,4-diisocyanatodibenzylthioether, bis(4-isocyanatomethylbenzene)sulfide, 4,4-methoxybenzenethioethyleneglycol-3,3-diisocyanate, diphenyldisulfide-4,4-diisocyanate, 2,2-dimethyldiphenyldisulfide-5,5-diisocyanate, 3,3-dimethyldiphenyldisulfide-5,5-diisocyanate, 3,3-dimethyldiphenyldisulfide-6,6-diisocyanate, 4,4-dimethyldiphenyldisulfide-5,5-diisocyanate, 3,3-dimethoxydiphenyldisulfide-4,4-diisocyanate, and 4,4-dimethoxydiphenyldisulfide-3,3-diisocyanate, and a sulfur-containing heterocyclic isocyanate compound including 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane.

The resin composition according to the present invention is a polymerizable composition including a polythiol compound and a polyisocyanate compound as main components. The resin composition may further include additives such as a catalyst, an internal release agent, a UV absorbent, a dye, a stabilizer, and a blowing agent, if required. For example, the resin for a urethane-based optical material may be prepared by injecting the resin composition including the polythiol compound, the polyisocyanate compound, and the additives, if required, into a mold for a lens and curing the resin composition. In addition, an epoxy compound, a thioepoxy compound, a compound having a vinyl group or a unsaturated group, a metallic compound, and the like, which are copolymerizable with the urethane resin composition, may further be added to the resin composition, and then the mixture may be polymerized. The resin for a urethane-based optical material prepared according to the present invention, for example, a urethane-based lens is prepared by template polymerization. In more detail, various additives and a catalyst are dissolved in an isocyanate compound, and a thiol compound is added thereto. Then, the composition is defoamed under reduced pressure while cooling. Then, after a predetermined period of time, the composition is injected into a glass mold which is fixed with an adhesive tape. The composition is cured while gradually increasing temperature over about 24 to 48 hours.

The urethane-based resin prepared according to the present invention has high refractive index, low dispersion, high heat resistance, excellent durability, light weight, high impact resistance, and excellent color property. Thus, the urethane-based resin according to the present invention may be efficiently used for an optical material, such as a lens or a prism, particularly, as a lens for eyeglasses and a camera lens.

In the optical material formed of the urethane-based resin according to the present invention, white tape residues and foams are rarely generated, and the optical material may be prepared in high yield. The white tape residues and foams may be measured, for example, via macroscopic examination of 100 sheets of the optical material exposed to a high pressure mercury lamp. When the white tape residues and foams are found, the amounts thereof are calculated as percentages. The optical material according to the present invention may be subjected to physical and chemical treatments, if required, such as surface polishing, antistatic treatment, hard coating, anti-reflective coating, dyeing, and light exposure in order to inhibit reflection, improve hardness, abrasion resistance, and chemical resistance, impart anti-fogging properties, and improve appearance.

EXAMPLES

Hereinafter, the present invention will be described in more detailed with reference to the following examples. However, these examples are provided only for illustration and should not be construed as limiting the technical scope of the present invention.

Evaluation

Moisture contents, white tape residue generation rates, and foam generation rates of the polymerizable compositions were evaluated using the following methods.

Moisture Content: Moisture content was measured using a Karl Fischer reagent through antomatic moisture measurement using a moisture analyzer produced by Metrohm Inc. equipped with an 860KF thermoprep, as an evaporator.

White tape residues: After polymerization and demolding, unpolished lens is exposed to light (1800 1× or greater). The amount of visually observable white portions was calculated as a percentage.

Foams: After polymerization and demolding, a lens is exposed to fluorescence. The amount of foams generated not by leakage but by light exposure was calculated as a percentage.

Example 1

1111 g (10 equiv) of isophorone diisocyanate, 0.1% of dibutyltindichloride as a curing catalyst, 0.1% of acidic phosphoric acid ester (Zelec UN), and 1.2% of a UV absorber (UV5411) were mixed and melted at a temperature of 10 to 15° C. 870 g (10 equiv) of polythiol including 1,2-bis[(2-mercaptoethyl)thio]-3-mercaptopropane as a main component was added to the mixture, followed by mixing, to obtain a homogenized solution. The polythiol had a moisture content of 650 ppm, and the resin composition had a moisture content of 350 ppm.

The homogenized resin composition was defoamed at a pressure of 1 torr or less over 1 hour and filtered using a 1 μm paper filter. Then, the resin composition was injected into a lens mold formed using a glass mold with a diameter of 80 mm and −6.0 D and a JS-100 tape. The lens mold was added to an oven and maintained at 20° C. over 2 hours. The oven was heated to 60° C. over 8 hours, and then heated to 80° C. over 3 hours, followed by maintaining the oven at the same temperature over 1 hour. Then, the oven was heated to 100° C. over 2 hours and maintained at the same temperature over 2 hours, and then heated to 130° C. over 3 hours and maintained at the same temperature over 2 hours. As described above, polymerization was performed at a temperature ranging from 20 to 130° C. over 23 hours. After completion of the polymerization, the lens mold was removed from the oven, and the composition was released to obtain a lens. The obtained lens was further annealed at 130° C. for 2 hours. 100 lenses were produced in the same manner, and generation of white tape residues and foams was evaluated. The results are shown in Table 1.

Example 2

Lenses were prepared in the same manner as in Example 1, except that the resin composition had a moisture content of 500 ppm. The results are shown in Table 1.

Example 3

Lenses were prepared in the same manner as in Example 1, except that the resin composition had a moisture content of 1,000 ppm. The results are shown in Table 1.

Example 4

Lenses were prepared in the same manner as in Example 1, except that the resin composition had a moisture content of 2,000 ppm. The results are shown in Table 1.

Example 5

Lenses were prepared in the same manner as in Example 1, except that the resin composition had a moisture content of 3,000 ppm. The results are shown in Table 1.

Comparative Example 1

Lenses were prepared in the same manner as in Example 1, except that the resin composition had a moisture content of 4,000 ppm. The results are shown in Table 1.

Comparative Example 2

Lenses were prepared in the same manner as in Example 1, except that the moisture content of the resin composition was adjusted to 100 ppm using polythiol having a moisture content of 200 ppm or less. The results are shown in Table 1.

Example 6

777 g (7 equiv) of isophorone diisocyanate, 252 g (3 equiv) of hexamethylene diisocyanate, 0.1% of dibutyltindichloride as a curing catalyst, 0.1% of acidic phosphoric acid ester (Zelec UN), and 1.2% of a UV absorber (UV5411) were mixed and melted at a temperature of 10 to 15° C. 783 g (9 equiv) of polythiol including 1,2-bis[(2-mercaptoethyl)thio]-3-mercaptopropane as a main component and 122 g (1 equiv) of pentaerythritol tetrakis3-mercaptopropionate were added to the mixture, followed by mixing, to obtain a homogenized solution. The polythiol had a moisture content of 800 ppm, and the polymerizable composition had a moisture content of 460 ppm.

The homogenized resin composition was defoamed at a pressure of 1 torr or less over 1 hour and filtered using a 1 μm paper filter. Then, the resin composition was injected into a lens mold formed of a glass mold with a diameter of 80 mm and −6.0 D and a JS-100 tape. The lens mold was added to an oven and maintained at 20° C. over 2 hours. The oven was heated to 60° C. over 8 hours, and then heated to 80° C. over 3 hours, followed by maintaining the oven at the same temperature over 1 hour. Then, the oven was heated to 100° C. over 2 hours and maintained at the same temperature over 2 hours, and then heated to 130° C. over 3 hours and maintained at the same temperature over 2 hours. As described above, polymerization was performed at a temperature ranging from 20 to 130° C. over 23 hours. After completion of the polymerization, the lens mold was removed from the oven, and the composition was released to obtain a lens. The obtained lens was further annealed at 130° C. for 2 hours. 100 lenses were produced in the same manner, and generation of white tape residues and foams was evaluated. The results are shown in Table 1.

Example 7

Lenses were prepared in the same manner as in Example 6, except that the resin composition had a moisture content of 1,200 ppm. The results are shown in Table 1.

Example 8

Lenses were prepared in the same manner as in Example 6, except that the resin composition had a moisture content of 2,200 ppm. The results are shown in Table 1.

Example 9

Lenses were prepared in the same manner as in Example 6, except that the resin composition had a moisture content of 2,800 ppm. The results are shown in Table 1.

Comparative Example 3

Lenses were prepared in the same manner as in Example 6, except that the resin composition had a moisture content of 5,000 ppm. The results are shown in Table 1.

Comparative Example 4

Lenses were prepared in the same manner as in Example 6, except that the moisture content of the resin composition was adjusted to 50 ppm using polythiol having a moisture content of 100 ppm or less. The results are shown in Table 1.

Example 10

1060 g (8 equiv) of dicyclohexylmethane-4,4-diisocyanate ($H_{12}MDI$), 168 g (2 equiv) of hexamethylene diisocyanate, 0.1% of dibutyltindichloride as a curing catalyst, 0.1% of acidic phosphoric acid ester (Zelec UN), and 1.2% of a UV absorber (UV5411) were mixed and melted at a temperature of 10 to 15° C. 783 g (9 equiv) of polythiol including 1,2-bis[(2-mercaptoethyl)thio]-3-mercaptopropane as a main component and 122 g (1 equiv) of pentaerythritol tetrakis 3-mercaptopropionate were added to the mixture, followed by mixing, to obtain a homogenized solution. The polythiol had a moisture content of 700 ppm, and the polymerizable composition had a moisture content of 450 ppm.

The homogenized resin composition was defoamed at a pressure of 1 torr or less over 1 hour and filtered using a 1 μm paper filter. Then, the resin composition was injected into a lens mold formed of a glass mold with a diameter of 80 mm and −6.0 D and a JS-100 tape. The lens mold was added to an oven and maintained at 20° C. over 2 hours. The oven was heated to 60° C. over 8 hours, and then heated to 80° C. over 3 hours, followed by maintaining the oven at the same temperature over 1 hour. Then, the oven was heated to 100° C. over 2 hours and maintained at the same temperature over 2 hours, and then heated to 130° C. over 3 hours and maintained at the same temperature over 2 hours. As described above, polymerization was performed at a temperature ranging from 20 to 130° C. over 23 hours. After completion of the polymerization, the lens mold was removed from the oven, and the composition was released to obtain a lens. The obtained lens was further annealed at 130° C. for 2 hours. 100 lenses were produced in the same manner, and generation of white tape residues and foams was evaluated. The results are shown in Table 1.

Example 11

Lenses were prepared in the same manner as in Example 10, except that the resin composition had a moisture content of 1,500 ppm. The results are shown in Table 1.

Example 12

Lenses were prepared in the same manner as in Example 10, except that the resin composition had a moisture content of 2,500 ppm. The results are shown in Table 1.

Comparative Example 5

Lenses were prepared in the same manner as in Example 10, except that the resin composition had a moisture content of 6,000 ppm. The results are shown in Table 1.

Comparative Example 6

Lenses were prepared in the same manner as in Example 10, except that the moisture content of the resin composition was adjusted to 100 ppm using polythiol having a moisture content of 200 ppm or less. The results are shown in Table 1.

TABLE 1

|  | Moisture content (ppm) | White tape residue generation rate (%) | Foam generation rate (%) |
|---|---|---|---|
| Example 1 | 350 | 15 | 6 |
| Example 2 | 500 | 12 | 8 |
| Example 3 | 1,000 | 8 | 4 |
| Example 4 | 2,000 | 6 | 11 |
| Example 5 | 3,000 | 6 | 20 |
| Example 6 | 460 | 18 | 8 |
| Example 7 | 1200 | 10 | 4 |
| Example 8 | 2200 | 9 | 10 |
| Example 9 | 2800 | 5 | 18 |
| Example 10 | 450 | 16 | 2 |
| Example 11 | 1500 | 11 | 6 |
| Example 12 | 2500 | 7 | 16 |
| Comparative Example 1 | 4,000 | 8 | 50 |
| Comparative Example 2 | 100 | 55 | 3 |
| Comparative Example 3 | 5,000 | 3 | 80 |
| Comparative Example 4 | 50 | 60 | 5 |
| Comparative Example 5 | 6,000 | 4 | 100 |
| Comparative Example 6 | 100 | 52 | 2 |

In a resin having appropriate moisture content as a urethane-based optical material, the white tape residue generation rate and the foam generation rate of the resin was in the range of about 0 to about 20%. In addition, based on the results of the examples and comparative examples, it was confirmed that foam generation rate increases as the moisture content of the resin composition increases, and the white tape residue generation rate increases as the moisture content of the resin composition decreases. In particular, the white tape residue generation varies based on the moisture content of 300 ppm, and the foam generation varies based on the moisture content of 3,000 ppm. Thus, the generation of white tape residues and foams may be minimized by adjusting the moisture content of the resin composition in the range of 300 to 3,000 ppm.

As is apparent from the above description, according to the present invention, a colorless, transparent, and high-quality urethane-based optical material may be efficiently prepared in high yield using a low-cost and widely available isocyanate compound through template-polymerization using a tape while minimizing generation of white tape residues and foams.

According to the present invention, causes of white tape residues and foams, which are commonly generated during the preparation of a polyurethane-based optical material, are thoroughly investigated. Thus, a colorless, transparent, and high-quality urethane-based optical material may be prepared in high yield by use of a low-cost widely available isocyanate compound without causing white tape residues and foams. The high-quality urethane-based optical material prepared in a cost-effective and efficient manner according to the present invention may be widely applied to optical lenses. Particularly, a colorless and transparent urethane-based lens having high refractive index, low dispersion, high impact resistance, easy dyeing property, and high processability may be prepared in a cost-effective and efficient manner. Thus, the urethane-based lens may be widely applied to lenses for eyeglasses.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a resin for a urethane-based optical material by template-polymerizing a resin composition in a glass mold constituted with a tape comprising a polythiol compound and a polyisocyanate compound,
    wherein the resin composition has a moisture content of 350 to 3000 ppm, and
    the polyisocyanate compound comprises at least one compound selected from the group consisting of isophorone diisocyanate, and hexamethylene diisocyanate.

2. The method according to claim 1, wherein the polythiol compound has a moisture content of 700 to 6,000 ppm.

3. The method according to claim 2, wherein the polythiol compound comprises at least one compound selected from the group consisting of 4-mercaptomethyl-1,8-dimercapto-3,6-dithiaoctane, 2,3-bis(2-mercaptoethylthio)-3-propane-1-thiol, 2,2-bis(mercaptomethyl)-1,3-propanedithiol, bis(2-mercaptoethyl)sulfide, tetrakis(mercaptomethyl)methane, 2-(2-mercaptoethylthio)propane-1,3-dithiol, 2-(2,3-bis(2-mercaptoethylthio)propylthio)ethanethiol, bis(2,3-dimercaptopropanyl)sulfide, bis(2,3-dimercaptopropanyl)disulfide, 1,2-bis(2-mercaptoethylthio)-3-mercaptopropane, 1,2-bis(2-(2-mercaptoethylthio)-3-mercaptopropylthio)ethane, bis(2-(2-mercaptoethylthio)-3-mercaptopropyl)sulfide, 2-(2-mercaptoethylthio)-3-2-mercapto-3-[3-mercapto-2-(2-mercaptoethylthio)-propylthio]propylthio-propane-1-thiol, 2,2-bis-(3-mercapto-propyonyloxymethyl)-butyl ester, 2-(2-mercaptoethylthio)-3-(2-(2-[3-mercapto-2-(2-mercaptoethylthio)-propylthio]ethylthio)ethylthio)propane-1-thiol, (4R,11S)-4,11-bis(mercaptomethyl)-3,6,9,12-tetrathiatetradecane-1,14-dithiol, (S)-3-((R-2,3-dimercaptopropyl)thio)propane-1,2-dithiol, (4R,14R)-4,14-bis(mercaptomethyl)-3,6,9,12,15-pentathiaheptane-1,17-dithiol, 3-((3-mercapto-2-((2-mercaptoethyl)thio)propyl)thio)propyl)thio)-2-((2-mercaptoethyl)thio)propane-1-thiol, 3,3'-dithiobis(propane-1,2-dithiol), (7R,11S)-7,11-bis(mercaptomethyl)-3,6,9,12,15-pentathiaheptane-1,17-dithiol, (7R,12S)-7,12-bis(mercaptomethyl)-3,6,9,10,13,16-hexathiaoctadecane-1,18-dithiol, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), trimethylolpropane tris(3-mercaptopropionate), pentaerythritol tetrakis(2-mercaptoacetate), bispentaerythritol-ether-hexakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane, and 2-(2,2-bis(mercaptodimethylthio)ethyl)-1,3-dithiethane.

4. The method according to claim 1, wherein the resin composition further comprises at least one iso(thio)cyanate compound selected from the group consisting of:

dicyclohexylmethane-4,4-diisocyanate ($H_{12}$MDI), methylcyclohexane diisocyanate, tolylene diisocyanate, phenylene diisocyanate, 1,3,5-tris(6-isocyanatohexyl)-[1,3,5]-triazine-2,4,6-(1H,3H,5H)-trione (HDI trimer), o,m,p-xylylene diisocyanate, and tetramethylxylylene diisocyanate (TMXDI), and tetramethylxylylene diisocyanate (TMXDI).

5. A resin composition for a urethane-based optical material comprising:

a polythiol compound; and a polyisocyanate compound comprising at least one compound selected from the group consisting of isophorone diisocyanate, and hexamethylene diisocyanate;

wherein the resin composition comprises a moisture content of 350-3000 ppm.

6. A resin for a urethane-based optical material prepared using the method according to claim 1.

7. An optical lens comprising the resin for a urethane-based optical material according to claim 6.

8. The optical lens according to claim 7, wherein the optical lens comprises a lens for eyeglasses.

* * * * *